Patented June 30, 1942

2,288,200

UNITED STATES PATENT OFFICE 2,288,200

PROCESS FOR THE PRODUCTION OF WATER-SOLUBLE CELLULOSE ETHERS IN POWDER FORM

Georg Meyer, Hanover, Germany

No Drawing. Application May 11, 1938, Serial No. 207,330. In Germany May 15, 1937

3 Claims. (Cl. 260—232)

This invention relates to a process for the production of water-soluble cellulose ethers in powder form.

A large number of cellulose ethers are known which dissolve in water and form highly viscous, strongly adhesive solutions. They are, therefore, used particularly as dressings and sizes, as thickeners for printing inks, as adhesives and color-fixing agents and the like. For example, methyl cellulose is obtained by the action of methyl chloride on cellulose in the presence of alkali, carboxyalkyl cellulose by treating cellulose with monohalogen fatty acids, and hydroxyalkyl cellulose by the action of alkylene oxide, epichlorhydrin and the like on cellulose. The salt-containing reaction products are usually purified by precipitating them with suitable solvents, such as alcohol, and then drying the precipitate after thorough extraction. A fine powder is obtained which dissolves relatively quickly in cold water to form highly viscous solutions.

These operations are however very troublesome since the salts present in the reaction products being only very slightly soluble in alcohol, the extraction takes a very long time. Moreover the solvent must be recovered and rectified. Furthermore, special precautions must be taken to avoid fire.

It has, therefore, been proposed to purify the reaction products of those ethers which form water-soluble salts or those which are soluble only in aqueous alkalies, by precipitating the cellulose ethers with acids, acid salts and the like. After drying, they can be brought into solution again with aqueous alkalies. It has been found, however, that these solutions are far less viscous than those which are obtained after precipitation with alcohol. Owing to the more or less acid reaction, cellulose always decomposes to a certain extent in the heat, in spite of very careful drying.

However, if these cellulose ethers, before drying, are dissolved in suitable quantities of alkalies and these neutral or alkaline solutions are dried in a known manner in drying chambers, on belts or the like, products are obtained which can be ground only with great difficulty and which, even after a long period of grinding still contain numerous coarse particles. Many hours are therefore required for dissolving such a powder.

I have found that very easily soluble powders are obtained by drying solutions of cellulose ether compounds, which are soluble both in cold and in hot water or aqueous alkalies, in thin layers on highly heated surfaces and grinding the dried product.

The films hitherto produced from cellulose ethers by drying at or below 100° C. are highly elastic and consequently cannot be ground. I have found, however, that by dissolving these cellulose ethers in a small quantity of water to more or less viscous pastes, and spreading these pastes in thin layers on surfaces heated above 100° C., drying takes place instantaneously, and films are obtained, which are very brittle and can be very easily comminuted to powder. In spite of heating to relatively high temperatures, the cellulose ethers are not impaired in any way. Drying proceeds with extraordinary rapidity. By immersing the powder in water, a highly viscous and very efficient solution is obtained. Swelling is completed within a few minutes.

The result obtained in accordance with this invention is all the more surprising since cellulose ethers which are soluble in cold water but insoluble in hot water, such as methyl cellulose, cannot be dried in the manner described.

On the other hand, it has been found that all cellulose ethers which do not separate in the heat from their aqueous, neutral or alkaline solutions, as hydroxyalkyl celluloses, for example, which are obtained by the action of epichlorhydrin, monochlorhydrin, alkylene oxide and the like on cellulose in the presence of alkali, can be dried between heated surfaces in thin layers and ground to form an easily soluble powder.

Rotating cylinders, heated to a temperature above 100° C., on which the product to be dried is spread in a thin layer, have proved particularly suitable for carrying out the process of this invention. The dry product may be removed from the cylinders by a scraping device in the form of brittle films, which can be easily ground to a fine powder.

The following example serves to illustrate how the process of this invention may be carried into effect:

A 25% suspension of carboxymethyl cellulose in water, produced in a known manner by the action of monochlor-acetic acid on alkali-cellulose, is neutralized with dilute caustic soda solution and spread in a thin layer on cylinders heated above 100° C. The product, which is obtained in flat cakes, is comminuted in a known manner.

I claim:

1. A process for the production of water-soluble cellulose ethers in powder form, in which solutions of cellulose ether compounds, which are soluble both in cold and in hot water and in aqueous alkali hydroxides, are dried in thin layers on surfaces heated to drying temperatures above 100° C.

2. A process for the production of water-soluble cellulose ethers in powder form, in which pasty solutions of cellulose ether compounds, which are soluble both in cold and in hot water and in aqueous alkali hydroxides, are dried in thin layers, on cylinders heated to drying temperatures above 100° C.

3. A process for the production of a water-soluble cellulose ether in powder form, in which a suspension of carboxymethyl cellulose in water is neutralized with dilute caustic soda solution, the neutralized solution is spread in thin layers on cylinders heated to drying temperatures above 100° C., and the dried product is removed from the cylinders and ground.

GEORG MEYER.